April 15, 1952 A. COTSWORTH, III 2,593,011

KEYED AUTOMATIC GAIN CONTROL

Filed July 17, 1948 2 SHEETS—SHEET 1

ALBERT COTSWORTH III
INVENTOR.

BY Bruce L Birchard
HIS AGENT

KEYED AUTOMATIC GAIN CONTROL

Filed July 17, 1948 2 SHEETS—SHEET 2

ALBERT COTSWORTH III
*INVENTOR.*

BY Bruce L Birchard

*HIS AGENT*

Patented Apr. 15, 1952 2,593,011

UNITED STATES PATENT OFFICE 2,593,011

KEYED AUTOMATIC GAIN CONTROL

Albert Cotsworth, III, Oak Park, Ill., assignor to Zenith Radio Corporation, a corporation of Illinois Application July 17, 1948, Serial No. 39,368

2 Claims. (Cl. 178—7.3)

This invention relates to television receiving systems, and more particularly to automatic gain controls for use in such systems.

It is an object of this invention to provide an automatic gain control circuit for use in television receiving systems, which circuit is essentially peak operating and responsive to the tips of the synchronizing pulses in television signals received by such systems.

Another object of this invention is to provide such an automatic gain control circuit which has high sensitivity at the intervals of occurrence of the received synchronizing pulses, and relatively low sensitivity during the intervals between the individual pulses.

A further object of this invention is to provide such a circuit for controlling the gain of a television receiving system, which circuit is substantially unresponsive to impulse noise signals and the like.

Yet a further object of this invention is to provide such a circuit in which the time constant is sufficiently short to compensate for rapid signal fading such as that caused by passing aircraft, and the like.

A still further object of this invention is to provide such an automatic gain control circuit which is simple and economical to construct, and in which sufficient amplification is imparted to the control potential to produce a very flat characteristic, without the requirement for a special power supply as would be needed when a direct current amplifier is used.

Figure 1:
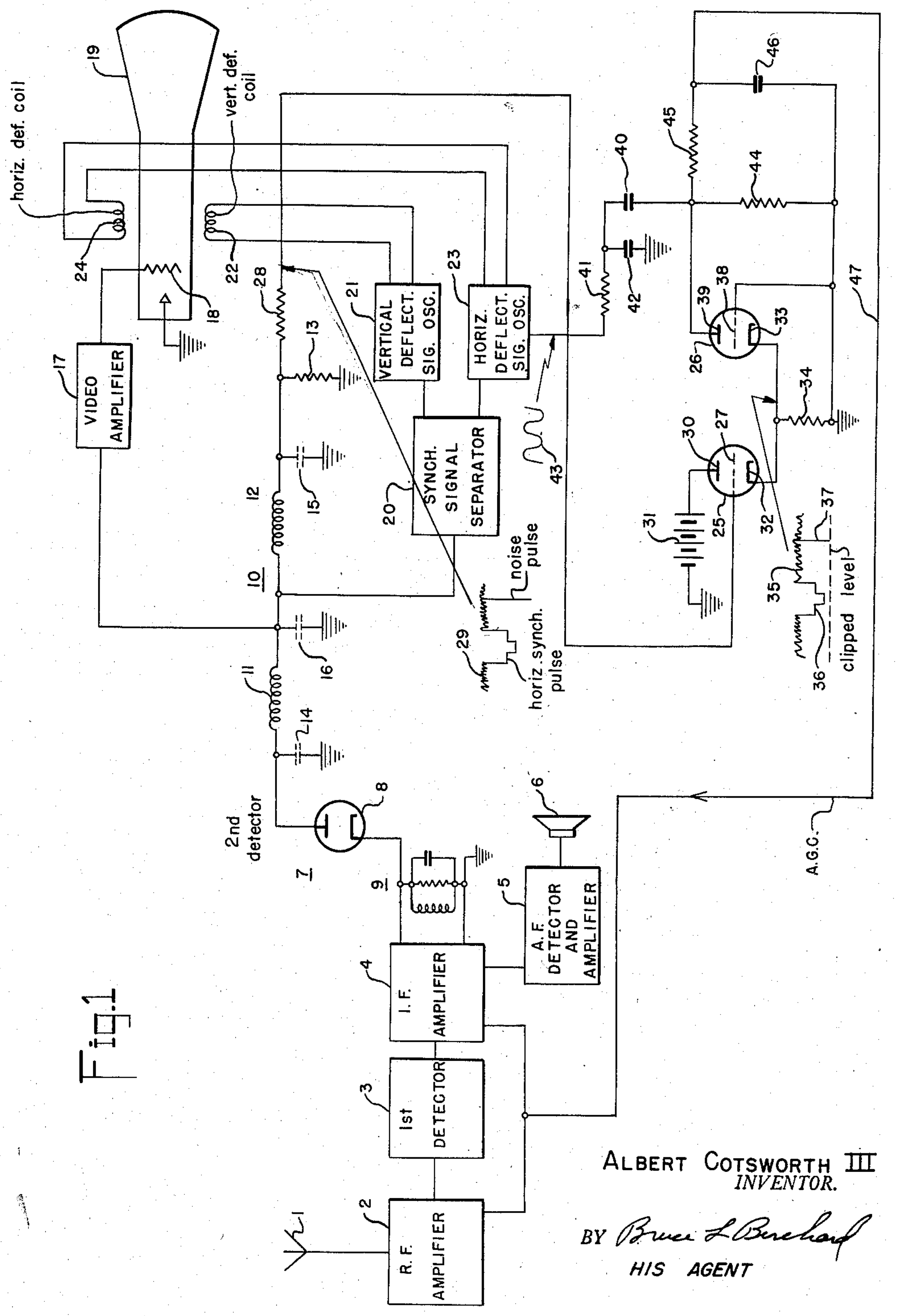
Figure 2:
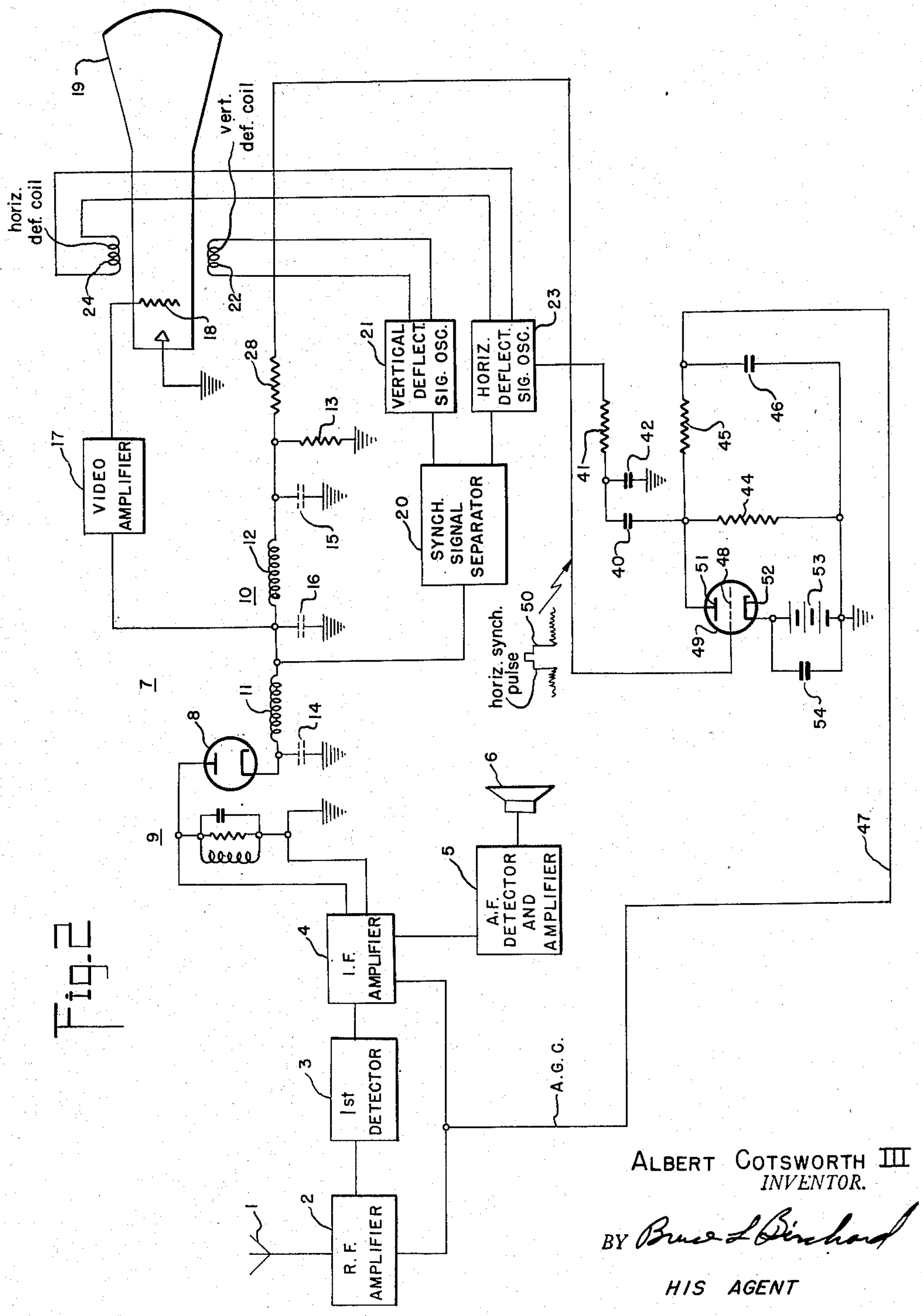

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1 shows a television receiver including one embodiment of the invention, and, Figure 2 shows such a receiver in which a second embodiment of the invention is incorporated.

Referring now to Figure 1, television signals are received on antenna 1, and the received signals are amplified in radio frequency amplifier stage or stages 2. The amplified signals from stages 2 are heterodyned in a usual mixer or first detector stage 3, and the resulting intermediate frequency signals are amplified in intermediate frequency stage or stages 4. The audio signals associated with the received television signals are detected and amplified in audio frequency detector and amplifier stages 5, and these detected signals are reproduced in signal translating device 6.

The video signals in the received television signal are detected in a second detector stage 7, shown in detail, this stage including a diode detector device 8. The video intermediate frequency signals from the intermediate frequency amplifier 4 are impressed between the cathode of device 8 and ground by means of the usual coupling network 9. Detected video signals appearing on the anode of diode 8 are passed through a usual low-pass filter network 10, which network includes series connected inductances 11 and 12, connected between the anode of device 8 and one extremity of a terminating resistor 13, the other extremity of resistor 13 being connected to ground. The ends of inductances 11 and 12 are coupled to ground by capacitors 14 and 15 respectively, and the junction of these inductances is coupled to ground by capacitor 16. The values of capacitors 14, 15 and 16 are extremely small, and the effect thereof may be obtained by the distributed capacity of the detector circuit.

The common junction of inductances 11 and 12 is connected to video amplifier stage or stages 17, and detected video signals are amplified in these stages and impressed in proper phase on control electrode 18 of cathode ray receiver image tube 19. The common junction of inductances 11 and 12 is further connected to signal separator stage 20, and this stage separates the vertical and horizontal synchronizing signals from the detected video signals. Vertical synchronizing signals from separator 20 are applied to vertical deflection signal oscillator 21, and vertical sweep signals derived from this oscillator are impressed across vertical sweep coil 22 of image tube 19. Horizontal synchronizing signals from separator 20 are used to synchronize horizontal deflection signal oscillator 23, and the sweep output of this oscillator is applied to the horizontal deflection coil 24 of image tube 19.

The proposed automatic gain control is adapted to operate on the tips of the synchronizing pulses of the received television signals. Any change in the level of these tips at the second detector output indicates a change in signal strength or in gain, and consequently such changes may be used to correct the gain of the radio frequency and intermediate frequency amplifier circuits.

The automatic gain control for the above described receiver circuit comprises a pair of electron discharge devices 25 and 26. Detected video signals from detector 7 are impressed on control electrode 27 of device 25 through resistor 28. The diode 8 of the detector circuit 7 is so arranged that the detected signals increase in a negative sense as the intermediate frequency carrier amplitude increases, and hence the synchronizing pulses contained in the video signals impressed on control electrode 27 of device 25 are negative going, as shown at 29.

The anode 30 of device 25 is directly connected to the positive terminal of a source of unidirectional potential 31, the negative terminal of which source is grounded. The cathode 32 of device 25 is directly connected to cathode 33 of device 26, these cathodes being connected to ground through common resistor 34. Since the device 25 is cathode coupled to device 26, video signals applied to control electrode 27 of device 25 are impressed on cathode 33 of device 26. The device 25 is so arranged that high noise pulses in the detected video signals are clipped thereby, and signals applied to cathode 33 are as shown in wave form 35, in which it can be seen that the clipped level is slightly above the level of the horizontal synchronizing pulses 36, and a noise pulse 37 is clipped at this level.

The device 26 functions as a grounded grid amplifier, the control electrode 38 thereof being connected directly to ground, as shown. The anode 39 of device 26 is coupled to the horizontal deflection signal oscillator through a capacitor 40 and a phase shifting network. The phase shifting network consists of resistor 41 connected in series with the capacitor 40, and a capacitor 42 connecting the common junction of resistor 41 and capacitor 40 to ground. Hence, the potential impressed on anode 39 of device 26 is derived from horizontal synchronizing oscillator 23. When the oscillator 23 is of the conventional automatic frequency controlled type, a sine wave 43 may be obtained from the transformer of the synchronized oscillator, the frequency of which sine wave is the frequency of the horizontal synchronizing pulses. However, signals of any wave form, derived from oscillator 23 or signal separator 20 and synchronized to the frequency of the horizontal synchronizing pulses, may be impressed on anode 39. In the ideal state, these signals would have the form of positive going pulses having a frequency and width equal to the horizontal synchronizing pulses, so that anode 39 of device 26 is driven positive, and device 26 made effective, solely during the intervals of occurrence of the horizontal synchronizing pulses.

The phase shifter comprising resistor 41 and capacitor 42 is so arranged that when the receiver is synchronized horizontally, the positive crest of the sine wave 43 drives anode 39 of device 26 positive at the same instants when the synchronizing pulses drive cathode 33 of device 26 negative, and the circuit is such that device 26 is conductive solely during such instants. The amount of space current flowing through device 26 at these instants is dependent upon the level of the synchronizing pulses impressed on cathode 33 and, hence, on the level of the received signals. Hence, a sine wave of potential appears across resistor 44, the average value of which is dependent upon the amount of space current in device 26 and, therefore, on the level of the received signals. This sine wave is filtered in a filter arrangement consisting of resistor 45 and capacitor 46 connected in series across resistor 44, and a control potential is obtained at the junction of resistor 45 and capacitor 46, which control potential is impressed on previous stages of the system, such as stages 2 and 4, by way of lead 47, to control the gain of these stages. It can be seen that the magnitude of this control potential is dependent upon the amount of space current flowing through device 26 and, hence, upon the strength of the received signals. It can further be seen that this control potential is independent of noise impulses such as impulse 37 in diagram 35, when such impulses occur at times when the anode potential of device 26 is such that this device cannot be made conductive.

A second embodiment of the invention is shown in Figure 2, wherein like components to the previous embodiment are designated by like numerals. In the circuit of Figure 2 a diode 8 of detector circuit 7 is so arranged that the detected signals increase in a positive sense as the intermediate frequency carrier amplitude increases, and hence the synchronizing pulses contained in the detected video signals are positive going. In the present instance, detected signals from detector circuit 7 are impressed on control electrode 48 of discharge device 49 through resistor 28, these detected signals being of the form shown by wave form 50. The discharge device 44 is connected to form the automatic gain control circuit, the anode 51 of this device being coupled to the horizontal deflection signal oscillator 23 through coupling capacitor 40 and the phase shifting network comprising resistor 41 and capacitor 42, as in the previous embodiment.

The cathode 52 of device 49 is connected to the positive terminal of a source of biasing potential 53, the negative terminal of this source being grounded. Source 53 is by-passed by capacitor 54. Due to the connection to source 53, the cathode 52 is biased positively, and device 49 may be made conductive solely during such intervals when the potential of anode 51 is at a positive peak due to the signal from oscillator 23. Phase shifting network 41—42 is arranged so that this positive peak occurs in synchronism with the synchronizing pulses on control electrode 48, and hence the tips of these pulses drive device 49 conductive, and as previously a control potential is derived on lead 47, the magnitude of this potential being dependent on the signal amplitude during the synchronizing pulses, and this magnitude being relatively independent of noise signals occurring when the anode 51 is not at a positive potential peak.

This invention therefore provides an automatic gain control that is essentially immune to noise impulse, and that may be given a short time constant, which short time constant was heretofore impracticable due to excessive variation in the automatic gain control potential imparted thereto by the relatively broad vertical synchronizing pulses.

While certain specific embodiments of the invention have been shown and described, it is apparent that modifications may be made without departing therefrom. It is intended in the appended claims to cover all such modifications as fall within the true spirit and scope of the invention.

I claim:

1. A television receiver for utilizing a composite television signal including video-signal components and recurring synchronizing-signal components comprising: an image-reproducing device and associated scanning elements; a sweep generator coupled to said scanning elements and including means for developing a sinusoidal signal having a frequency corresponding to the repetition frequency of said synchronizing-signal components; a synchronizing circuit for supplying said synchronizing-signal components to said sweep generator to control the operation thereof; a gain control system including a normally non-conductive electron-discharge device having input and output electrodes; means for coupling said output electrodes to said generator to establish a potential difference therebetween which varies in accordance with said sinusoidal signal and tends to make said discharge device conductive in time coincidence with said synchronizing-signal components; an amplitude limiter for suppressing components of said television signal exceeding the amplitude of said synchronizing-signal components thereof, said limiter being coupled to said input electrodes so that said synchronizing-signal components augment the effect of the potential difference of said output electrodes and render said discharge device conductive during said synchronizing-signal components; a filter circuit coupled to said output electrodes for producing a control potential having an amplitude proportional to the amplitude of said synchronizing-signal components; and means for utilizing said control potential to control the gain of said receiver.

2. A television receiver for utilizing a composite television signal including video-signal components and recurring synchronizing-signal components comprising: an image-reproducing device and associated scanning elements; a sweep generator coupled to said scanning elements and including means for developing a sinusoidal signal having a frequency corresponding to the repetition frequency of said synchronizing-signal components; a synchronizing circuit for supplying said synchronizing-signal components to said sweep generator to control the operation thereof; a gain control system including a normally non-conductive electron-discharge device having an anode, a cathode connected to a point of reference potential through a resistive impedance, and a control electrode directly connected to said point of reference potential; means for coupling said anode to said generator to vary the potential of said anode with respect to said reference potential level in accordance with said sinusoidal signal to tend to make said discharge device conductive in time coincidence with said synchronizing-signal components; an amplitude limiter for suppressing components of said television signal exceeding the amplitude of said synchronizing-signal components thereof, said limiter including an electron-discharge device having an anode connected to a source of unidirectional potential, a control electrode for receiving said television signal with said synchronizing-signal components of negative polarity, and a cathode connected to the junction of said first-mentioned cathode and said resistive impedance so that said synchronizing-signal components augment the effect of the anode potential variations of said first-mentioned discharge device and render said device conductive during the peak portion of said synchronizing-signal components; a filter circuit coupled to said anode and cathode of said first-mentioned discharge device for producing a control potential having an amplitude proportional to the amplitude of said synchronizing-signal components; and means for utilizing said control potential to control the gain of said receiver.

ALBERT COTSWORTH, III.

REFERENCES CITED

The following references are of record in the file of this patent:

UNITED STATES PATENTS

| Number | Name | Date |
|---|---|---|
| 2,197,900 | Schlesinger | Apr. 23, 1940 |
| 2,230,295 | Holmes | Feb. 4, 1941 |
| 2,307,387 | Blumlein | Jan. 5, 1943 |
| 2,332,681 | Wendt | Oct. 26, 1943 |
| 2,401,573 | Kozanowski | June 4, 1946 |
| 2,469,606 | Mayle | May 10, 1949 |

FOREIGN PATENTS

| Number | Country | Date |
|---|---|---|
| 845,897 | France | Sept. 4, 1939 |
| 873,623 | France | July 15, 1942 |